US011531721B2

(12) United States Patent
Ivanov et al.

(10) Patent No.: US 11,531,721 B2
(45) Date of Patent: Dec. 20, 2022

(54) METHOD OF USING A PORTION OF A URL AND AN INTERSTITIAL PAGE TO MAKE A DISCLOSURE STATEMENT FOR REGULATION COMPLIANCE

(71) Applicant: WOWLINK Pte. Ltd., Singapore (SG)

(72) Inventors: Valentin Vyacheslavovich Ivanov, Tashkent (UZ); Konstantin Radov, Singapore (SG); Vladimir Plakitin, Astrakhan (RU); Rafael Shmaryahu, Karmiel (IL)

(73) Assignee: WOWLINK Pte. Ltd., Singapore (SG)

( * ) Notice: Subject to any disclaimer, the term of this patent is extended or adjusted under 35 U.S.C. 154(b) by 0 days.

(21) Appl. No.: 17/160,300

(22) Filed: Jan. 27, 2021

(65) Prior Publication Data

US 2021/0232653 A1    Jul. 29, 2021

Related U.S. Application Data

(60) Provisional application No. 62/966,994, filed on Jan. 28, 2020.

(51) Int. Cl.
*G06F 40/166* (2020.01)
*G06F 16/955* (2019.01)

(52) U.S. Cl.
CPC ........ *G06F 16/9566* (2019.01); *G06F 40/166* (2020.01)

(58) Field of Classification Search
CPC .................................................. G06F 16/9566
See application file for complete search history.

(56) References Cited

U.S. PATENT DOCUMENTS

| | | | |
|---|---|---|---|
| 8,918,515 B1 * | 12/2014 | Partow-Navid et al. | H04L 29/08576 |
| 2002/0059076 A1 * | 5/2002 | Grainger et al. | G06F 17/60 |
| 2007/0208744 A1 * | 9/2007 | Krishnaprasad et al. | G06F 17/30 |
| 2013/0159826 A1 * | 6/2013 | Mason et al. | G06F 17/00 |
| 2013/0185207 A1 * | 7/2013 | Lyons et al. | G06Q 20/40 |
| 2015/0025981 A1 * | 1/2015 | Zaretsky et al. | G06F 17/30887 |
| 2017/0076007 A1 * | 3/2017 | Knoll et al. | G06F 17/30887 |
| 2018/0114029 A1 * | 4/2018 | Roesler | G06F 21/60 |
| 2020/0380059 A1 * | 12/2020 | Ivanov et al. | G06F 16/955 |

* cited by examiner

*Primary Examiner* — James J Debrow
(74) *Attorney, Agent, or Firm* — Michael D. Eisenberg

(57) ABSTRACT

URL shortening and redirection, as provided by the systems and methods herein, allow advertisers and influencers to: (1) generate links that aid in helping make a clear disclosure about the nature of the link or content where the link is intended; (2) redirect the users by both placing a disclosure statement directly into: (a) the URL structure and (b) into the interstitial page that is displayed after clicking on the URL and prior to redirection to the destination address.

11 Claims, 3 Drawing Sheets

METHOD OF USING A PORTION OF A URL AND AN INTERSTITIAL PAGE TO MAKE A DISCLOSURE STATEMENT FOR REGULATION COMPLIANCE

CROSS REFERENCE TO RELATED APPLICATIONS

This application claims priority from U.S. Provisional Application Ser. No. 62/966,994 entitled "Method Of Using A Portion Of A URL And An Interstitial Page To Make a Disclosure Statement For Regulation Compliance", filed on Jan. 28, 2020, which is hereby incorporated herein by reference in its entirety.

FIELD OF THE INVENTION

The present invention relates to uniform resource locating (URL) shortening.

BACKGROUND OF THE INVENTION

There are number of regulations, including Federal U.S. regulations, for example, FTC (Federal Trade Commission) that requires publishers of the information, for example, social media influencers, make an explicit disclosure about, for example, using an affiliate links, sponsored links or advertisement links in their posts in order to make the audience completely aware of the nature of the shared links and the relationships between the influencer and brands or businesses they are sharing the information about. In particular, FTC requires "URL links for posting or sharing in social media or email should include a disclosure at the beginning of the native ad's URL", meaning that the disclosure (e.g. "ad", "advertisement", "sponsored", "affiliate" etc.) shall be part of the URL in order to comply with FTC guidelines.

What is needed is a system and/or method for ensuring that consumers understand that the content is advertising. Advertisers should ensure that the format of any link for posting in social media does not mislead consumers about its commercial nature.

BRIEF SUMMARY OF THE EMBODIMENTS OF THE INVENTION

In a variant, a method for URL shortening comprises: generating a new short URL having a disclosure statement in the URL structure, redirection parameters comprise a destination URL, information about a domain name to be used for a short URL, information about an interstitial page displayed on a visitor device prior to redirection, information about disclosure statement displayed on the interstitial page, and the type of action to be taken by the visitor device in order to get redirected from the interstitial page to the destination URL; generating the interstitial page with a disclosure statement defined by a client device; and redirecting the visitor device to a destination URL through the interstitial page, wherein the interstitial page comprises at least one of the disclosure statement defined by the client and access control to the destination URL.

In another variant, the type of action comprises: waiting for a timer set for a certain time interval to elapse; clicking or tapping a button or link; providing a password for further redirecting; providing a consent or agreement with certain conditions or statement; and providing confirmation of certain conditions comprising at least one of age and location.

In yet another variant, the redirection parameter further comprises: the destination URL; information about a domain name corresponds for a short URL; information about an interstitial page displayed on a visitor device prior to redirection; information about a disclosure statement displayed on the interstitial page; the type of action to be taken by the visitor device to get redirected from the interstitial page to the destination URL; and redirection conditions comprising a user agent on the visitor device comprising at least one of a browser, an operation system, a device type, preferred language of the visitor device, geographical location of the visitor device, a total number of clicks on the short link, and time intervals.

In yet another further embodiment, the method for URL shortening further comprises extracting the link ID from the new short URL.

In a variant, a computer system for URL shortening comprises: a domain; a short URL containing a disclosure statement in a URL structure; a destination URL; a client device, wherein the client device connects to the system via a URL shortening server; a visitor device, wherein the visitor device connects to the system via the URL shortening server; an interstitial page editor or selector, wherein the interstitial page editor or selector generates or selects a pre-created interstitial page with a pre-defined or defined by a client disclosure statement; an interstitial page containing a disclosure statement; and wherein the URL shortening server is in communication with the client and visitor devices and redirecting the visitor device from the interstitial page with the disclosure statement to the destination URL.

In another variant, the computer system for URL shortening further comprises: a server script or application, or an application on the client device for automatically or manually transforming regular URLs to the URLs with a disclosure in the URL structure redirecting visitor device to the destination address via interstitial page or screen containing the disclosure statement.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

Figure 1:
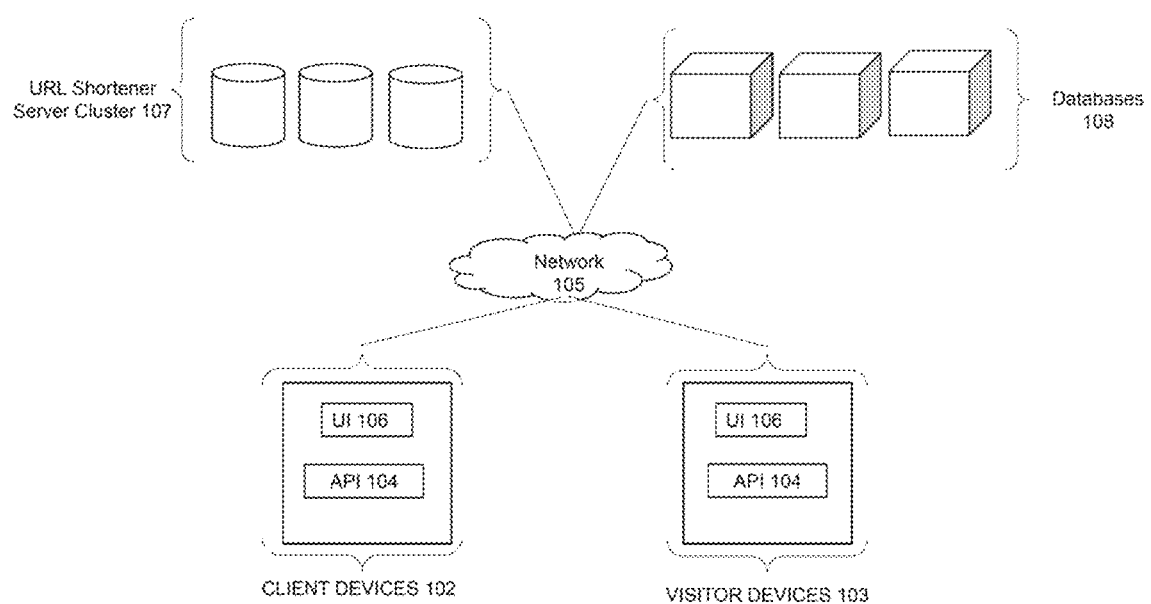
FIG. 1 is a computing environment for generating a new short URL and facilitating visitor interaction with the URL shortener service.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

The following reference numbers are used throughout the description and correspond to the elements as indicated below.

102 Client Devices
103 Visitor Devices
104 API residing on Client Devices 102 and Visitor Devices 103 for connecting to URL Shortener Server 107
105 Network forms telecommunication connection between URL Shortener Server Cluster 107, Database 108, Client Devices 102, and Visitor Devices 103
106 User Interface residing on Client Devices 102 and Visitor Devices 103
107 URL Shortener Server cluster
108 Databases connected to network 105
201 A step where URL shortener server cluster 107 receives the destinate URL where client devices 102 paste the destination URL into special field in the URL Shortener website, or app, or using API
202 A step where URL shortener server cluster 107 generates Unique Link Identifier
203 A step where URL shortener server cluster 107 receives the type of disclosure in URL structure where the client devices 102 select type of disclosure in URL structure
204 A step where URL shortener server cluster 107 receives the type of disclosure for interstitial page where the client devices 102 select type of disclosure for interstitial page
205 A step where URL Shortener server cluster 107 records data about generated new URL in the Database
206 A step where URL shortener server cluster 107 sends the generated and set up link back to client
301 A step where URL shortener server cluster 107 processes the following: the visitor device 103 interaction with the URL shortener server 107 which may start when visitor device 103 clicks on the link that is seen somewhere in the social media or received in the messenger (e.g., the Client device 102 generating the link by using URL shortener); the visitor device 103 clicks on the link; and visitor devices 103 send a request to the URL shortener server cluster 107 with the link that he clicked for further processing. (e.g. https://sponsored.domain.com/slug)
302 A step where URL shortener server cluster 107 processes the received request with link
303 A step where URL shortener server cluster 107 sends the interstitial page with disclosure to the visitor device 103, wherein the visitor device 103 displays an interstitial page with disclosure
304 A step where URL shortener server cluster 107 redirects visitor devices 103 to destination resource The systems and methods herein generate URLs that can help advertisers and influencers to ensure that the user has been explicitly notified about the nature of the link that the user has clicked on. URL shortening and redirection, as provided by the systems and methods herein, allow advertisers and influencers to: (1) generate links that aid in helping make a clear disclosure about the nature of the link or content as to where the link is intended; and (2) redirect the users by both placing a disclosure statement directly into: (a) the URL structure and (b) into the interstitial page that is displayed after clicking on the URL and prior to redirection to the destination address.

Referring to FIG. 1, the systems and methods herein are directed for URL shortening within a computing environment of servers having processors and memory and computer readable instructions stored thereon (i.e., URL shortening server cluster 107), websites which are accessible by network 105, APIs 104 on client devices 102 and visitor devices 103, and databases (DB) 108 that provide functionality for the URL shortening service operation, communication with other parties (i.e., users of client device 102 and visitor devices 103), storage of the information about redirections on databases 108, links, providing access to click statistics and analytics via APIs 104. Respective users of client devices 102 are: (1) connecting to a service provided by URL Shortener Server Cluster 107; and (2) optionally registering with the service; and (3) optionally setting up an account with the service.

Through the API 104 in client devices 102, access to the service functionality is provided by URL shortener server cluster 107, thereby allowing the generation of short links. The short link may include the links (optionally) that use the domain name defined by the client (client's branded domain name). Client devices 102 comprise the client's PC, mobile device, smartphone, or tablet that has an application (e.g., browser) that allows webpage content displayed in UI 106, executing scripts on the webpage (e.g., JavaScripts), and communicating with other devices via network 105. Visitor devices 103 comprises a member of the community that has access to network 105 and can receive short links from the client devices 102. Through API 104 on visitor devices 103, the user of visitor devices 103 can click on short to get redirected to the destination address. The visitor devices 103 and client devices 102 may have the same selection and capabilities each other, as displayed in UI 106. The destination address comprises the URL of the webpage, website, server, file, document, or application anywhere on the Internet or local network (i.e., network 105). Client device 102 is directed to use the destination address by URL Shortener Server Cluster 107 in response to URL Shortener Server Cluster 108 generates a short link. The generated short links redirect the visitor devices 103 to the destination address. The redirection of the visitor device 103 to the destination address may depend on the redirection conditions selected by the client and can be performed via an interstitial page that may contain a disclosure, a disclaimer, or any other information specified by the client or required by the regulation. Redirection conditions included but are not limited to: visitor's user agent (browser, operation system, device type), visitor's preferred language, visitor's geographical location, total number of clicks on the short link, and time interval (i.e., elapsed time).

Figure 2:
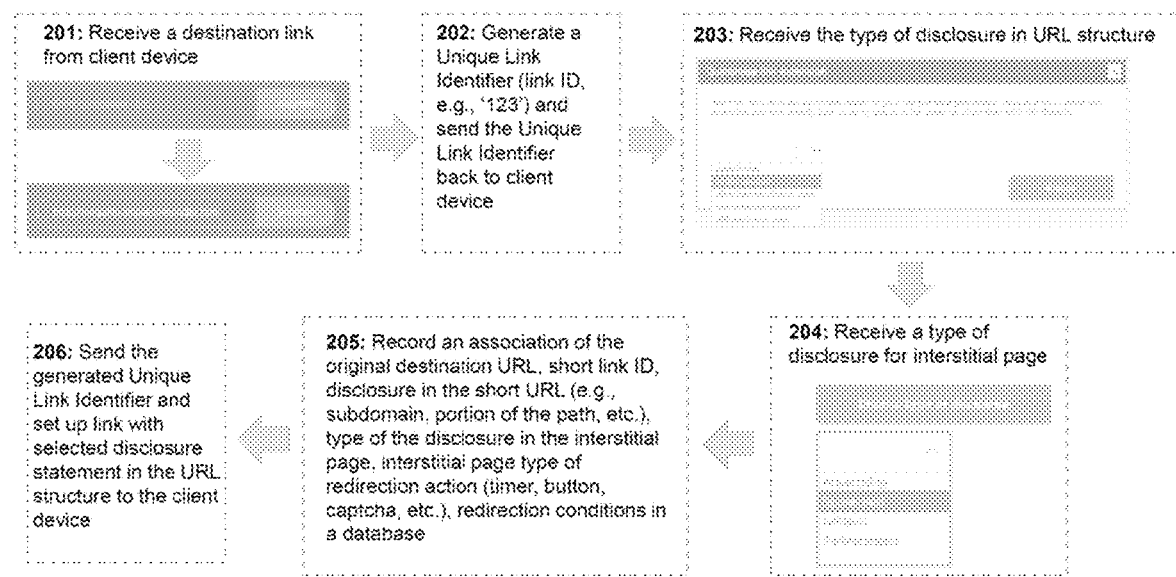
FIG. 2 is a flowchart of the steps for generating a new short URL.
Figure 3:
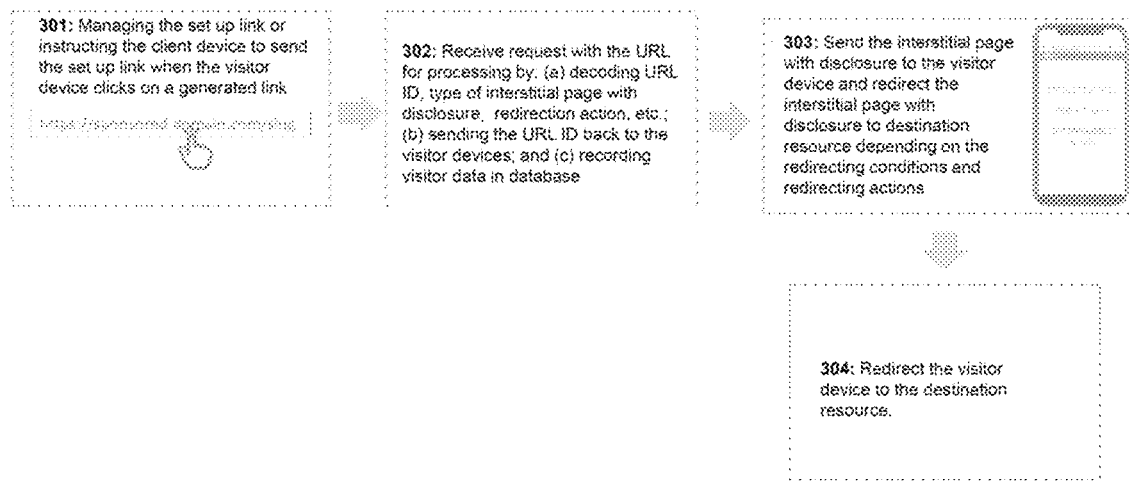
FIG. 3 is a flowchart of the visitor interaction with the URL shortener service.

Referring to FIG. 2 and FIG. 3, flowcharts are depicted which are implemented by URL shortening server cluster 107. In the flowchart of FIG. 2, URL shortener server cluster 107 interacts with client devices 102 when implementing the systems and methods herein for URL shortening. In step 201, URL shortener server cluster 107 receives a destination link from client devices 102. URL shortener server cluster 107 sends a prompt for entering UI which is accompanied with a "Shorten" button to UI 106 of client devices 102. In step 202, URL shortener server cluster 107 generates a new short URL with a generated link ID, wherein the generated link ID is sent back to client devices 102. In step 103, URL shortener server cluster 107 receives the type of disclosure when the client device selects a part of the URL structure (e.g., the sub-domain representing disclosure statement). In step 204, URL shortener server cluster 107 receives a type of disclosure for interstitial page when client devices 102 selects a type of an interstitial page, type of the disclosure statement on the interstitial page, redirection conditions (controlled access to the destination address by location, type of visitor device's operating system, browser etc.) and type of the action required from the visitor device to activate redirection to a destination address (e.g. by a timer, or clicking/tapping on the button, providing consent (i.e., permission to access the destination URL is granted by URL shortener server cluster 107)). In a step 205, URL shortener server cluster 107 forms a connection to the URL Shortener Server database(s) (i.e., databases 108). More specifically, URL shortener server cluster 107 associates parameters with the generated link, including but not limited to the destination resource URL, generated new link ID, domain name used for the generated new URL, selected part of the URL structure or sub-domain representing disclosure statement, selected type of the interstitial page with the selected type of the disclosure statement on interstitial page (e.g., advertising, sponsored, affiliate, and partnership), redirection conditions, and type of the required for visitor redirection action. The associated parameters are recorded (i.e., sent to databases 108), In step 106, URL shortener server 107 sends the generated link (e.g., the set up link) back to client device 102.

In the flowchart of FIG. 3, URL shortener server cluster 107 interacts with visitor devices 102 when implementing the systems and methods herein for URL shortening.

In step 301, URL shortener server cluster 107 sends the set up link or instructs the client devices 102 to send the set up link when visitor device 103 clicks on the generated link. In step 302, URL shortener server cluster 107 receives the request for URL for processing by decoding the request from visitor devices 103; recording information about visitor devices 103 and sending the recorded information to the databases 108; and locating parameters for the requested link in the database. The parameters include but are not limited to the destination resource URL, type of the interstitial page selected for the clicked link, type of the disclosure statement on interstitial page set for the clicked link, redirection conditions, type of the redirection action required from the visitor in order to be redirected to the destination resource.

In step 303, URL shortener server cluster 107 sends the interstitial page with a disclosure to the visitor device and redirect the interstitial page with the disclosure to destination resource depending on the redirecting conditions and redirecting actions. The redirection actions include but are not limited to: the "Continue" button, which is configured to be clicked on and subsequently processed by URL shortener server cluster 107; a consent button, which is configured to provide: (1) consent with certain conditions or (2) disclosure (e.g., receiving client's consent for the personal data) to be processed by the URL destination website; an agreement button, which is configured to be clicked on for the redirection to the destination website; a confirmation button, which is configured to be clicked on for meeting certain age requirements prior to redirection; and password prompt, which is configured for entering pre-defined passwords for the redirection. The interstitial page with the disclosure statement is displayed on UI 106 of visitor device 103. In step 304, URL shortener server cluster 107 redirects visitor devices 103 to the destination address if the redirection condition allows redirection for given visitor devices 103.

Using a URL shortener server cluster 107 for managing website, app, or 3rd party website or app that uses URL shortener service API, client devices 102 specify the destination address that may be in a form of a long URL (e.g., http://longurlexample.com/index.html) for transformation to a short URL using the disclosure as part of the URL structure (e.g., a sub-domain). The sub-domain from the client devices 102 is received by the URL shortener server cluster 107. Stated another way, the URL shortener server cluster 107 returns the data containing shortened URL to client devices 102. To UI 106 in client devices 102, the available list that the server cluster 107 provides to the client device 102 (e.g. list of subdomains, domains, URL parts) can be selected and subsequently received by URL shortener server cluster 107 with long URL as one of the options for implementation as a part of the short link.

The URL shortener server cluster 107 generates a new short URL and sends the new short URL back to client devices 102. Client devices 102 receives the new short URL from the URL shortener server cluster 107 and (optionally) sets redirection parameters that may include not limited to a destination URL and information about a client's domain name to be used for a short URL (e.g. domain.com) that may include sub-domain representing types of disclosure statement (e.g. ad.domain.com, advertisement.domain.com, sponsored.domain.com, and affiliate.domain.com), information about an interstitial page that is displayed on visitor devices 103 prior to redirection including type of disclosure statement displayed on the interstitial page (e.g., statement related to using advertisement link, sponsored links, affiliate links, etc.). The type of disclosure for interstitial page and the type of action to be taken by the visitor devices 103 to get redirected from the interstitial page to the destination URL are received and enforced by URL shortener server cluster 107. An example of such an action is clicking on a "Continue" button or waiting for a certain amount of time prior to redirection, thereby providing consent (i.e., permission to access the destination URL is granted by URL shortener server cluster 107). Consent of the data subject also refers to any freely given, specific, informed, and unambiguous indication of the data subject's wishes by which he or she, by a statement or by a clear affirmative action, signifies agreement to the processing of personal data relating to him or her. For example, URL shortener server cluster 107 allows the client devices 102 to facilitate permissible action with visitor devices 103. The visitor devices 103 provides consent which triggers to UI 106 on visitor devices 103 a statement, for example, "by clicking Continue button you are providing your consent for the destination website to process your personal data" on the interstitial page. The user of visitor device 103 reads the statement on UI 106 on visitor device 103 and clicks Continue on UI 106 on visitor device 103, and thereby providing agreement or affirmative action which signifies agreement to the processing of personal data on the website where visitor device 103 is redirected (e.g., the destination URL). The action or redirection can be also related to access control or limitation of the access to the final destination URL (e.g., password protection) so only the visitor devices 103 that have a certain password are redirected to the destination URL. In this instance, the package of the information transmitted in redirection parameters to the system and recorded into databases 108 includes a password (or a password hash).

Optionally, client devices 102 can also send a desirable unique link ID with redirection parameters, as instructed and enforced by URL shortener server cluster 107. For example, client devices 102 may want to use a certain combination of letters or words for a short link (e.g. ad.domain.com/news) instead of a link ID that is generated by URL shortener server cluster 107. The URL shortener server cluster 107 generates the unique link ID (e.g., '123'); checks the suggested client ID for uniqueness, or if there is no suggested link ID provided by the client; and sends the generated short link with a new link ID back to client devices 102.

The client devices 102 receive the short link from URL shortener server cluster 107 and shares the short link via social media channels or other communication channels to visitor devices 103. As facilitated by URL shortener server cluster 107, visitor devices 103 can click the short link (e.g., sponsored.domain.com/123) and get redirected to the interstitial page with the disclosure statement and then to the final destination URL.

Visitor devices 103 interaction with the URL shortening service occurs after receiving the short URL (e.g., https://sponsored.domain.com/123 in FIG. 3) through social channels, messenger, or other communication channels and clicking on that link (e.g., e.g., https://sponsored.domain.com/123 in FIG. 3). The browser on the visitor devices 103 sends a request to URL shortener server cluster 107 with the URL of the link, e.g., https://sponsored.domain.com/123.) Stated another way, the URL shortener server cluster 107 receives the request; processes the request, extracts the link ID (e.g. '123') from the URL (e.g. https://sponsored.domain.com/123); finds all the redirection parameters associated with the received link and link ID in the database; records visitor data to databases 108 for further click statistics and analytics services provided to client device 102; and redirects visitor device 103 to the pre-defined by the client interstitial page with the disclosure statement. The URL shortener server cluster 107 stores the data for all links in the special table and generates unique IDs one time per link while creating or generating a new link with database 108. The special table can be one of the tables in a relational database. The new link with database 108 is the URL address and accompanying options (e.g., buttons described above) associated with the URL address, which are received by the URL shortener server cluster 107 from client devices 102. URL shortener server cluster 107 implements or applies: (1) an AUTO INCREMENT function where each record corresponds to a unique short link and (2) Generated ID function in other tables for generalization analytics data. The interstitial page with the disclosure statement is displayed on UI 106 of the visitor devices 103.

Upon execution by the visitor device 103 of the required redirection action predefined by the client devices 102, URL shortener server cluster 107 instructs visitor device 103 to be redirected from the interstitial page to the destination address. For example, visitor device 103 accesses a browser, which makes AJAX request(s) to URL shortener server cluster 107, which is requesting a destination URL and then redirects to the received destination URL via JavaScript Object window. The browser, as accessed on visitor device 103, redirects to the destination URL through a HTML META refresh tag.

In implementation of the various embodiments, embodiments of the invention may comprise nodes, such as a personal computing device (e.g., a personal computer), laptop, PDA, cellular phone or other personal computing or communication devices. A network computing device, such as a server or a plurality of servers, computers, or processors, combined to define a computer system or network (e.g., network 105 which uses a set of common communication protocols over digital interconnections for the purpose of sharing resources located on or provided by the network nodes) to provide the URL shortening as provided by URL shortener server cluster.

The nodes of a computer system or nodes with in a network may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD as user interface 106), an external input component (e.g., keyboard or keypad), and/or cursor control component (e.g., mouse or trackball). A disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. Hardwired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. The computer readable medium is non-transitory (e.g., a non-transitory memory). In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PSTN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa (e.g., a virtual machine implementation or a logical hardware implementation).

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method for provisioning an interstitial page containing a disclosure statement based on a shortened destination URL, comprising:
    detecting a user click on a link to the destination URL;
    generating a short URL of the destination URL in response to the user click on the link, wherein the short URL references the interstitial page comprising the disclosure statement;
    rendering, prior to redirection to the destination URL, the interstitial page configured to provide the user with a choice comprising redirection to the destination URL with collection of user personal data or redirection to the destination URL without collection of the user personal data, wherein the choice is associated with redirection parameters;
    determining consent of the user for collection of the user personal data based on the redirection parameters;
    redirecting the user to the destination URL with or without collection of the user personal data based on the consent of the user; and
    recording the consent of the user.

2. The method of claim 1, further comprising:
    waiting for a timer set for a certain time interval to elapse;
    detecting tapping a button or the link to the destination URL;
    receiving a password for further redirecting to the destination URL;
    receiving the consent comprising conditions; and
    providing confirmation of the conditions comprising at least one of user age and location.

3. The method of claim 1, wherein the redirection parameters further comprise:
    the destination URL;
    information about a domain name corresponding to a short URL;
    information about the interstitial page displayed on a visitor device prior to the redirection to the destination URL;
    information about the disclosure statement displayed on the interstitial page;
    a type of action to be taken by the visitor device to get redirected from the interstitial page to the destination URL; and
    the user personal data comprising a user agent on the visitor device comprising at least one of a browser, an operation system, a device type, preferred language of the visitor device, geographical location of the visitor device, a total number of clicks on the short link, and time intervals.

4. The method of claim 1, further comprising extracting a link ID from the new short URL.

5. A system for provisioning an interstitial page containing a disclosure statement based on a shortened destination URL, comprising:
    a processor of a URL shortening server connected to a visitor device;
    a memory on which are stored machine-readable instructions that when executed by the processor, cause the processor to:
        detect a user click on a link to the destination URL;
        generate a short URL of the destination URL in response to the user click on the link, wherein the short URL references the interstitial page comprising the disclosure statement;
        render, prior to redirection to the destination URL, the interstitial page configured to provide the user with a choice comprising redirection to the destination URL with collection of user personal data or redirection to the destination URL without collection of the user personal data, wherein the choice is associated with redirection parameters;
        determine consent of the user for collection of the user personal data based on the redirection parameters;
        redirect the user to the destination URL with or without collection of the user personal data based on the consent of the user; and
        record the consent of the user.

6. The system of claim 5, further comprising instructions that when executed by the processor, cause the processor to transform the destination URL into the short URL comprising a disclosure type indicator embedded into a structure of the short URL, wherein the disclosure type indicator is associated with a nature of the disclosure referenced by the destination URL.

7. A non-transitory computer readable medium comprising instructions, that when read by a processor, cause the processor to perform:
    detecting a user click on a link to the destination URL;
    generating a short URL of the destination URL in response to the user click on the link, wherein the short URL references the interstitial page comprising the disclosure statement;
    rendering, prior to redirection to the destination URL, the interstitial page configured to provide the user with a choice comprising redirection to the destination URL with collection of user personal data or redirection to the destination URL without collection of the user personal data, wherein the choice is associated with redirection parameters;
    determining consent of the user for collection of the user personal data based on the redirection parameters;

redirecting the user to the destination URL with or without collection of the user personal data based on the consent of the user; and recording the consent of the user.

8. The non-transitory computer readable medium of claim 7, further comprising instructions, that when read by the processor, cause the processor to:

wait for a timer set for a certain time interval to elapse;
detect tapping a button or the link to the destination URL;
receive a password for further redirecting to the destination URL;
receive the consent comprising conditions; and
provide confirmation of the conditions comprising at least one of user age and location.

9. The non-transitory computer readable medium of claim 7, wherein the redirection parameters further comprises:

the destination URL;
information about a domain name corresponding to the short URL;
information about the interstitial page displayed on a visitor device prior to the redirection to the destination URL;
information about the disclosure statement displayed on the interstitial page; a type of action to be taken by the visitor device to get redirected from the interstitial page to the destination URL; and
the user personal data comprising a user agent on the visitor device comprising at least one of a browser, an operation system, a device type, preferred language of the visitor device, geographical location of the visitor device, a total number of clicks on the short link, and time intervals.

10. The non-transitory computer readable medium of claim 7, further comprising instructions, that when read by the processor, cause the processor to extract a link ID from the new short URL.

11. The non-transitory computer readable medium of claim 7, further comprising instructions, that when read by the processor, cause the processor to:

transform the destination URL to the short URL with a reference to the interstitial page comprising the disclosure statement within the short URL structure, wherein the interstitial page is configured to redirect a visitor device of a user to a destination address.

* * * * *